US008052879B2

(12) United States Patent
Gross et al.

(10) Patent No.: US 8,052,879 B2
(45) Date of Patent: Nov. 8, 2011

(54) APPARATUS AND METHOD FOR INCREASING FILTER CAPACITY USING ULTRASONIC REGENERATION

(75) Inventors: David J. Gross, Bethesda, MD (US); David Arguelles, Herndon, VA (US)

(73) Assignee: Dominion Engineering, Inc., Reston, VA (US)

( * ) Notice: Subject to any disclaimer, the term of this patent is extended or adjusted under 35 U.S.C. 154(b) by 397 days.

(21) Appl. No.: 12/130,866

(22) Filed: May 30, 2008

(65) Prior Publication Data

US 2008/0296236 A1   Dec. 4, 2008

Related U.S. Application Data

(60) Provisional application No. 60/940,928, filed on May 30, 2007.

(51) Int. Cl.
*B01D 37/04* (2006.01)
*B01D 29/66* (2006.01)
*B01D 29/72* (2006.01)

(52) U.S. Cl. ......... 210/791; 210/798; 210/741; 210/108

(58) Field of Classification Search ............ None
See application file for complete search history.

(56) References Cited

U.S. PATENT DOCUMENTS

| | | | | |
|---|---|---|---|---|
| 4,482,461 A | * | 11/1984 | Hindman et al. | 210/741 |
| 5,298,161 A | | 3/1994 | Sieg | |
| 6,117,341 A | * | 9/2000 | Bray et al. | 210/791 |
| 6,251,294 B1 | * | 6/2001 | Davis et al. | 210/785 |
| 6,395,186 B1 | * | 5/2002 | De Kock et al. | 210/748.05 |
| 6,787,046 B2 | * | 9/2004 | De Kock et al. | 210/748.05 |
| 7,083,735 B2 | * | 8/2006 | Laing | 210/791 |
| 7,445,716 B2 | * | 11/2008 | Quintel et al. | 210/636 |
| 2001/0050095 A1 | | 12/2001 | Yamada et al. | |

FOREIGN PATENT DOCUMENTS

| | | |
|---|---|---|
| DE | 33 35 127 A1 | 4/1985 |
| WO | 92/11923 A1 | 7/1992 |
| WO | WO 2008/151090 A1 * | 12/2008 |

OTHER PUBLICATIONS

Written Opinion and International Search Report in related application PCT/US08/65433 mailed Aug. 8, 2008.
International Preliminary Report in Patentability in related application PCT/US08/65433 issued Dec. 1, 2009.
European Search Report in related Application No. PCT/US2008065433 mailed Apr. 29, 2011.

* cited by examiner

*Primary Examiner* — Robert James Popovics
(74) *Attorney, Agent, or Firm* — Pillsbury Winthrop Shaw Pittman LLP (57) ABSTRACT

A filter system and associated methods of filtering utilize a combination of ultrasonically enhanced backwashing and a modified filter media configurations for increasing the specific loading on a portion of the filter media, thereby tending to increase the total particulate holding capacity of the improved filter. Depending on factors such as the filter configuration, the particulate size distribution and the differential pressure that can be maintained across the filter, it is expected that the particulate holding capacity can be more than doubled relative to a conventional filter having similarly configured filter media.

7 Claims, 9 Drawing Sheets

APPARATUS AND METHOD FOR INCREASING FILTER CAPACITY USING ULTRASONIC REGENERATION

PRIORITY STATEMENT

This application claims priority under 35 U.S.C. §119(e) from U.S. Provisional Patent Appl. No. 60/940,928, which was filed in the U.S. Patent & Trademark Office on May 30, 2007, the contents of which are incorporated herein, in its entirety, by reference.

BACKGROUND

Radioactive particulate waste, such as that generated during ultrasonic fuel cleaning of irradiated nuclear fuel assemblies, may be difficult and costly to dispose of The radioactive aspect of such particulate waste presents unique filtration cost considerations relative to more conventional filtration applications as a result of the various rules and regulations governing handling, shipment, and disposal of the spent or loaded filters. Often, the cost of filtration is dominated by the disposal cost of the contaminated filters. Accordingly, increasing the particulate holding capacity of each filter will tend to reduce the total filtration cost.

The particulate holding capacity of a membrane-type filter is dependent upon a number of factors including, for example, the available differential pressure across the media, the available area of filter media and the flow rate through the filter. Accordingly, the particulate holding capacity may be increased by using a variety of techniques including, for example, providing additional differential pressure, increasing the amount of media in the filter and/or by reducing the flow rate through the filter.

SUMMARY

Example embodiments of the new filter system and associated methods of filtering utilize a combination of ultrasonically enhanced backwashing and a modified filter media configuration for increasing the specific loading on a portion of the filter media, thereby tending to increase the total particulate holding capacity of the improved filter. Depending on factors such as the filter configuration, the particulate size distribution and the available pressure drop that can be maintained across the filter, it is expected that the particulate holding capacity can be more than doubled relative to a conventional filter having similarly configured filter media.

The primary applications for the improved filter are expected to be in both boiling water reactor (BWR) and pressurized water reactor (PWR) fuel cleaning applications although those skilled in the will appreciate that increasing the effective filter capacity may be useful in a wide range of applications. It is expected that in the BWR and PWR applications, the filter assembly will be packaged or configured in a form compatible with a conventional fuel assembly location that can, in turn, be cleaned using an appropriate ultrasonic fuel cleaning fixture. For other applications, those skilled in the art will appreciate that a wide range of filter assemblies and ultrasonic fixtures may be adapted to achieve equipment configurations consistent with the disclosed embodiments and for practicing the disclosed methods.

Equipment and methods consistent with the disclosed embodiments are expected to provide one or more advantages over conventional filtration assemblies and methods. It is expected, for example, that equipment and methods consistent with the disclosed embodiments may include one or more advantages including reducing the cost of the filter media by reducing the volume of filter media required for capturing a given quantity of particulates, increasing the life of the filter assembly by reducing the effective filling rate, reducing the number of contaminated filters that will be stored onsite, reducing the number of filters for disposal and the associated costs and/or may allow for the use of existing ultrasonic cleaning equipment thereby reducing the associated equipment expenses and maintenance.

While filtration of the particulate waste generated during ultrasonic fuel cleaning waste is expected to be one of the more common uses of the disclosed methods and apparatus, those skilled in the art will appreciate that the disclosure and application are not so limited. For example, it is expected that the disclosed methods and apparatus may have particular utility in other applications including, but not limited to, local filtration of miscellaneous radioactive and non-radioactive waste in spent fuel pools, reactor cavities and other vessels or regions that tend to collect, or be particularly sensitive to, particular contamination. Example embodiments may include, without limitation, underwater vacuuming of swarf and/or other machining debris that could be generated and/or removed during plant maintenance activities or plant decommissioning. Other example embodiments may include, without limitation, underwater vacuuming as part of general pool/cavity cleanup, and local area filtration to improve water clarity and/or area dose rates, large scale filtration to reduce or eliminate number of filters used in fuel pool and reactor cavity filtration systems, any other filtration application where the required filter particulate holding capacity is beyond that which can be achieved using traditional membrane filters and/or those applications in which it is desirable to contain all of the captured material within the original filter for ultimate disposal.

Even other example embodiments may include, without limitation, regeneration of filter pre-coat layers. For example, some filtration applications include a pre-coat layer that is applied to the media before use in the primary filtration application. The apparatus and methods disclosed herein could be utilized for removing the spent/clogged pre-coat layer from the active filtration region, allowing the application of a new pre-coat on the cleaned filter layer without needing to dispose of the removed pre-coat media separately.

Prior art methods include various sequences and configurations for cleaning and backwashing filter media including some in which backwashing, with or without the application of ultrasonics, is used in regenerating filtration media by removing the particulates from the media so that it can be disposed of elsewhere (e.g., discharged to a waste water system). The example apparatus and methods disclosed herein, however, provide means for increasing filter capacity through periodic relocation of particulates within a filter assembly. The relocation of the particulates within the filter assembly onto/into a designated collection region allows another region of the filter assembly to be "regenerated" to provide a renewed filter region. The availability of this regeneration region, in turn, allows the filter assembly to continue providing useful filtration function well beyond the point where conventionally arranged and operated filters would require replacement to maintain normal operation.

BRIEF DESCRIPTION OF THE DRAWINGS

Example embodiments described below will be more clearly understood when the detailed description is considered in conjunction with the accompanying drawings, in which.

It should be noted that these Figures are intended to illustrate the general characteristics of methods, structure and/or materials utilized in certain example embodiments and to supplement the written description provided below. These drawings are not, however, drawn to scale and do not precisely reflect the precise structural or performance characteristics of any given embodiment and should not, therefore, be interpreted as defining or limiting the range of values or properties encompassed by example embodiments. Further, the drawings have been simplified by omitting peripheral structure including, for example, piping, valves, pumps, power supplies, cables, controllers and other equipment, with the understanding that those skilled in the art would be able to determine and construct the peripheral structure necessary for the full range of embodiments disclosed herein and obvious variations thereof.

DETAILED DESCRIPTION

Figure 1:
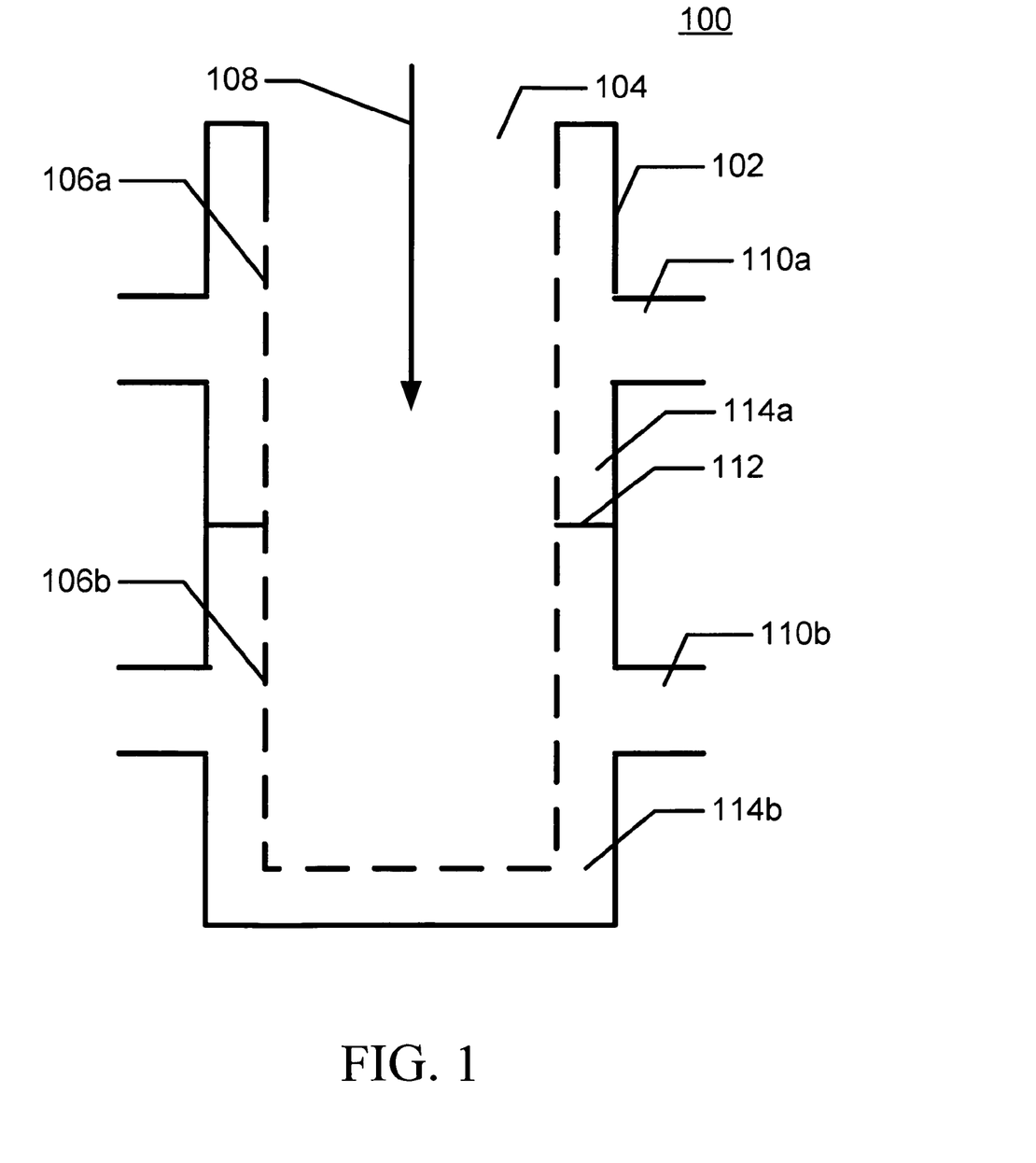
FIG. 1 illustrates an example embodiment of an apparatus suitable for practicing the methods detailed in the detailed disclosure.

An example embodiment of an apparatus 100 for practicing the disclosed methods is illustrated in FIG. 1 and includes a filter housing 102 having a primary inlet 104 for introducing contaminated fluid in an inlet direction 108 into the filter assembly that, in turn, includes a regeneration region 106a and a collection region 106b. Fluid passing through the regeneration region and collection region of the filter assembly may then be removed from the filter housing through associated conduits 110a, 110b. In order to provide for differential flows through the regeneration region and collection region, the filter assembly and/or the filter housing may include a flange 112 or equivalent structure for separating the flows and defining first and second flow paths. These flow paths may include corresponding plenum regions 114a, 114b between external filter assembly surfaces and interior surfaces of the filter housing. As will be appreciate by those skilled in the art, additional structure may be provided in the plenum for supporting the filter assembly to allow for higher differential pressures to be maintained while reducing the risk of damage to the filter assembly.

As will be appreciated by those skilled in the art, the filter assembly may comprise a unitary structure, i.e., one single filter element, or may comprise a plurality of filter elements that cooperate to form a complete assembly. As will also be appreciated by those skilled in the art, embodiments including a plurality of filter elements may utilize a plurality of filter housing sub-units that cooperate to form a complete filter housing, thereby increasing the range of apparatus configurations that may be utilized to practice methods consistent with those detailed below. For example, a parallel structure would allow for alternating filtration and regeneration operations between two or more corresponding flow paths to allow for off-line regeneration while maintaining the filtration function of the apparatus.

Figure 2:
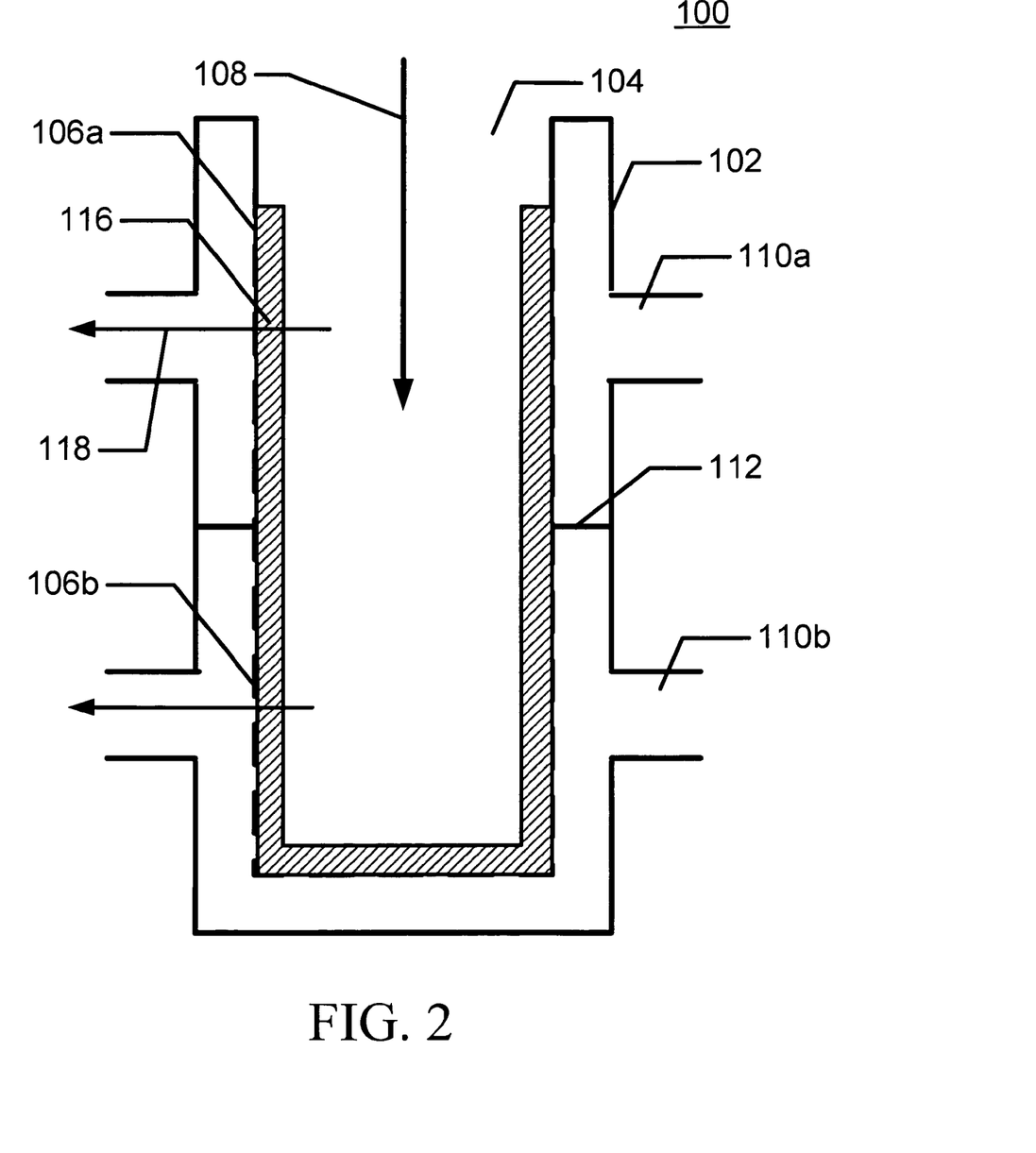
FIGS. 2-5 illustrate an example embodiment of a filtration method as detailed in the disclosure below.
Figure 3:
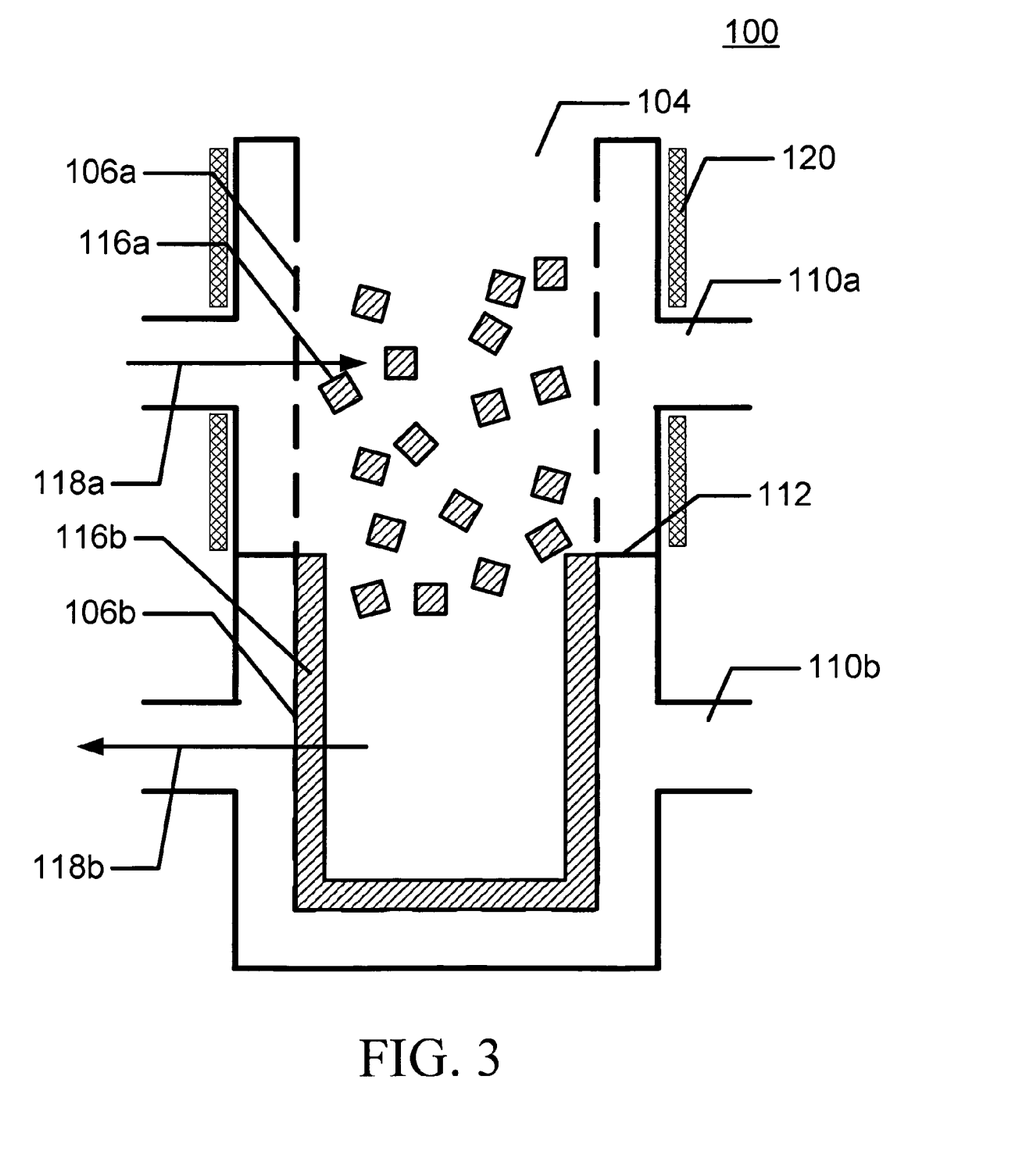

As illustrated in FIGS. 2-5, during a filtration operation a layer of particulates or "filter cake" 116 may be formed on the surfaces of the regeneration and collection regions of the filter assembly as a particulate containing fluid is fed into the filter assembly and passed through the filter assembly. The filtrate may then been removed from the filter housing through conduits 110a, 110b in a first flow direction 118 as illustrated in FIG. 2. When regeneration is desired including, for example, when the pressure drop across the filter assembly exceeds an upper pressure target or the filter cake in the regeneration region exceeds a target thickness, the regeneration process can be initiated. During the regeneration process, as illustrated in FIG. 3, the portion of the filter cake in the regeneration region of the filter assembly is reduced or removed through a combination of a reversed fluid flow in a second flow direction 118a, e.g., a backwash flow and ultrasonic agitation provided by one or more ultrasonic transducers 120 that are configured for applying ultrasonic energy to at least a portion of the regeneration region.

Figure 4:
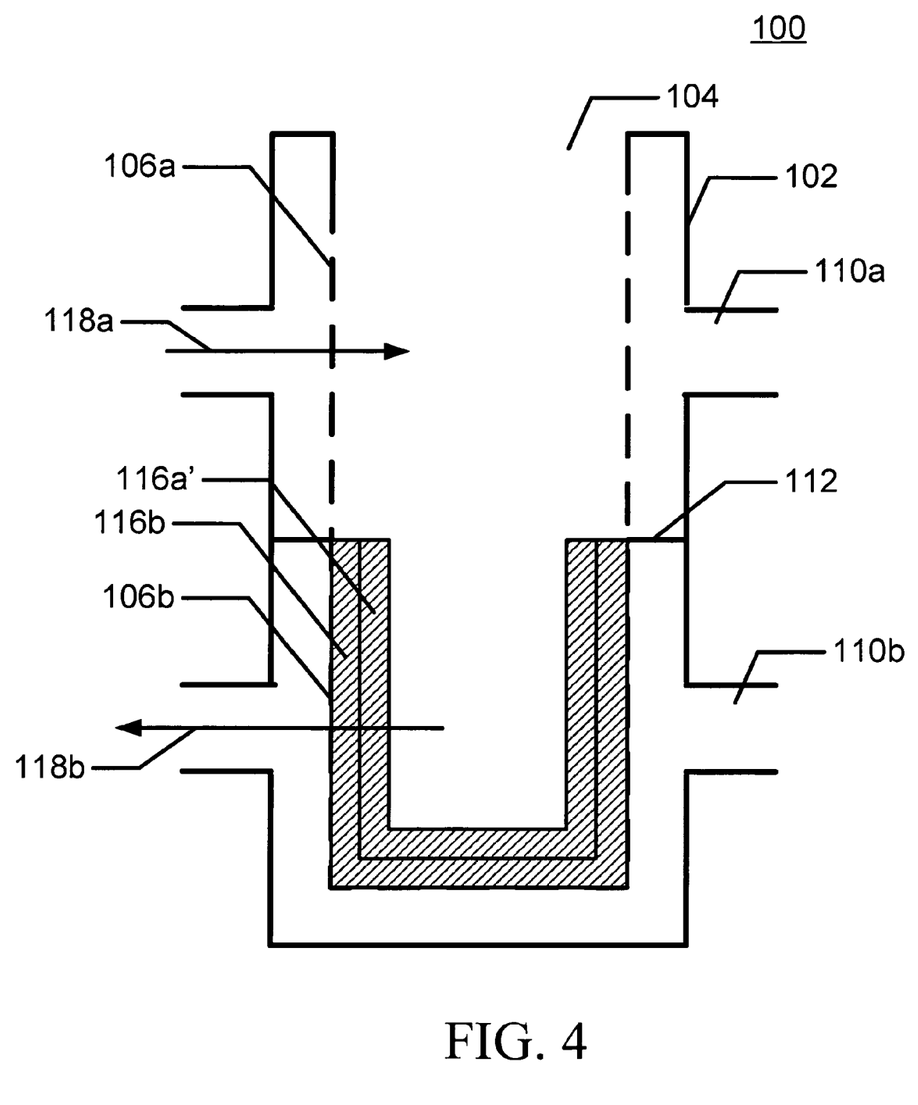
Figure 6:
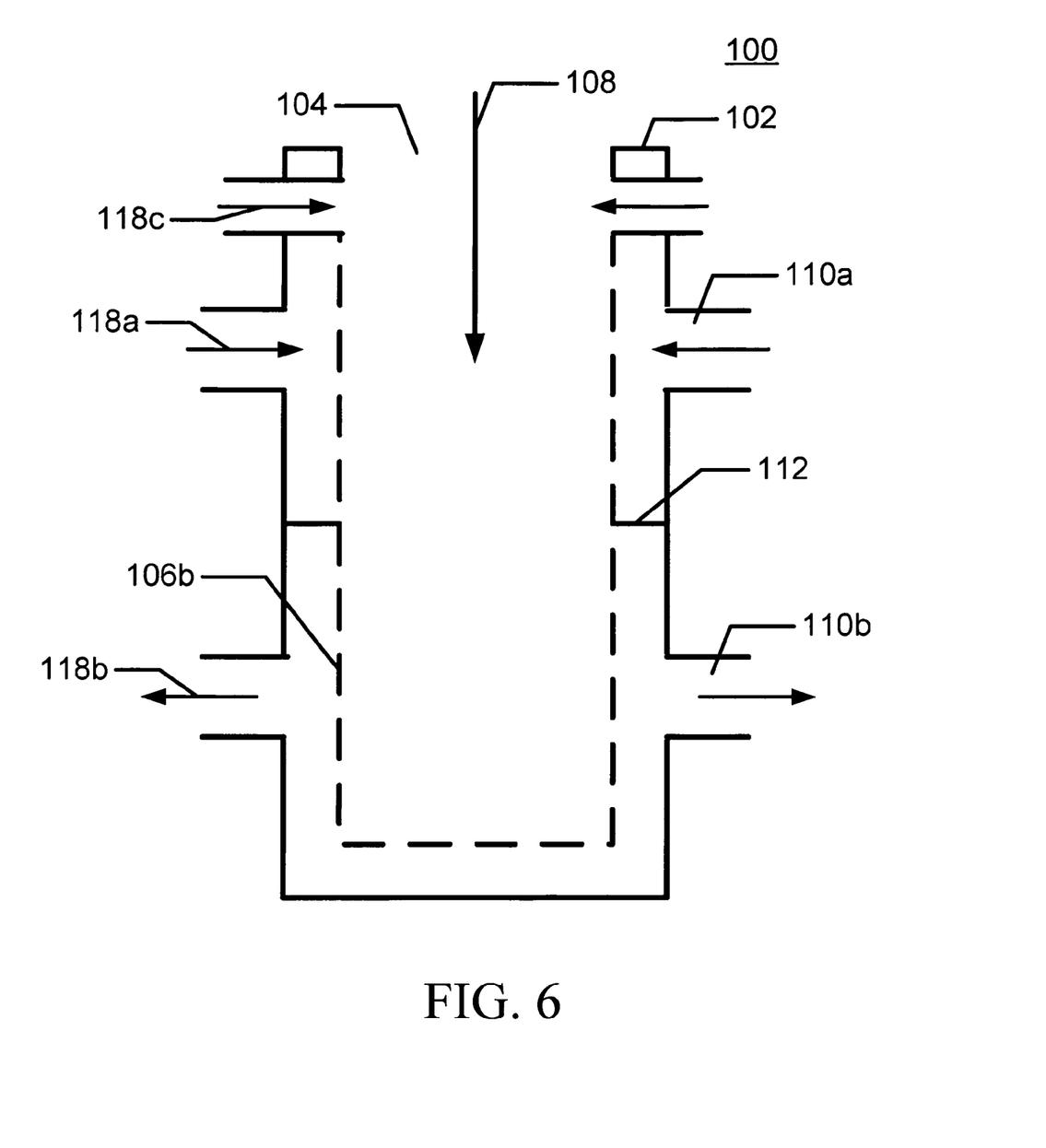
FIG. 6 illustrates another example embodiment of an apparatus suitable for practicing the methods detailed in the detailed disclosure.

As illustrated in FIG. 4, the removed portions of the filter cake 116a are then drawn into the collection region of the filter assembly by fluid passing through the filter assembly in direction 118b to form an additional filter cake layer 116a on the remaining portion of the initial filter cake 116b. The flow rate and inlet positions of the backwash flow during the regeneration process may be reduced relative to that utilized during the filtration process and configured to reduce the tendency of fines to be removed entirely from the filter assembly. The filter assembly may also be oriented in such a manner that the desired redistribution of the removed particulates is assisted by gravity, e.g., by arranging the regeneration region above the collection region within the filter assembly. As illustrated in FIG. 6, additional flow paths 118c and/or mechanical baffle or barrier means (not shown) may also be utilized for suppressing the migration of fines out of the filter assembly during the backwash operation.

It is believed that the low flow rate during the regeneration process allows for increased specific area loading on the collection region filter elements than would otherwise be possible at normal operating flow rates. It is anticipated that ultrasonic agitation during at least a portion of the regeneration process will improve the regeneration process and increase the portion of the filter cake that is removed from the regeneration region, particularly at lower flow rates.

Figure 5:
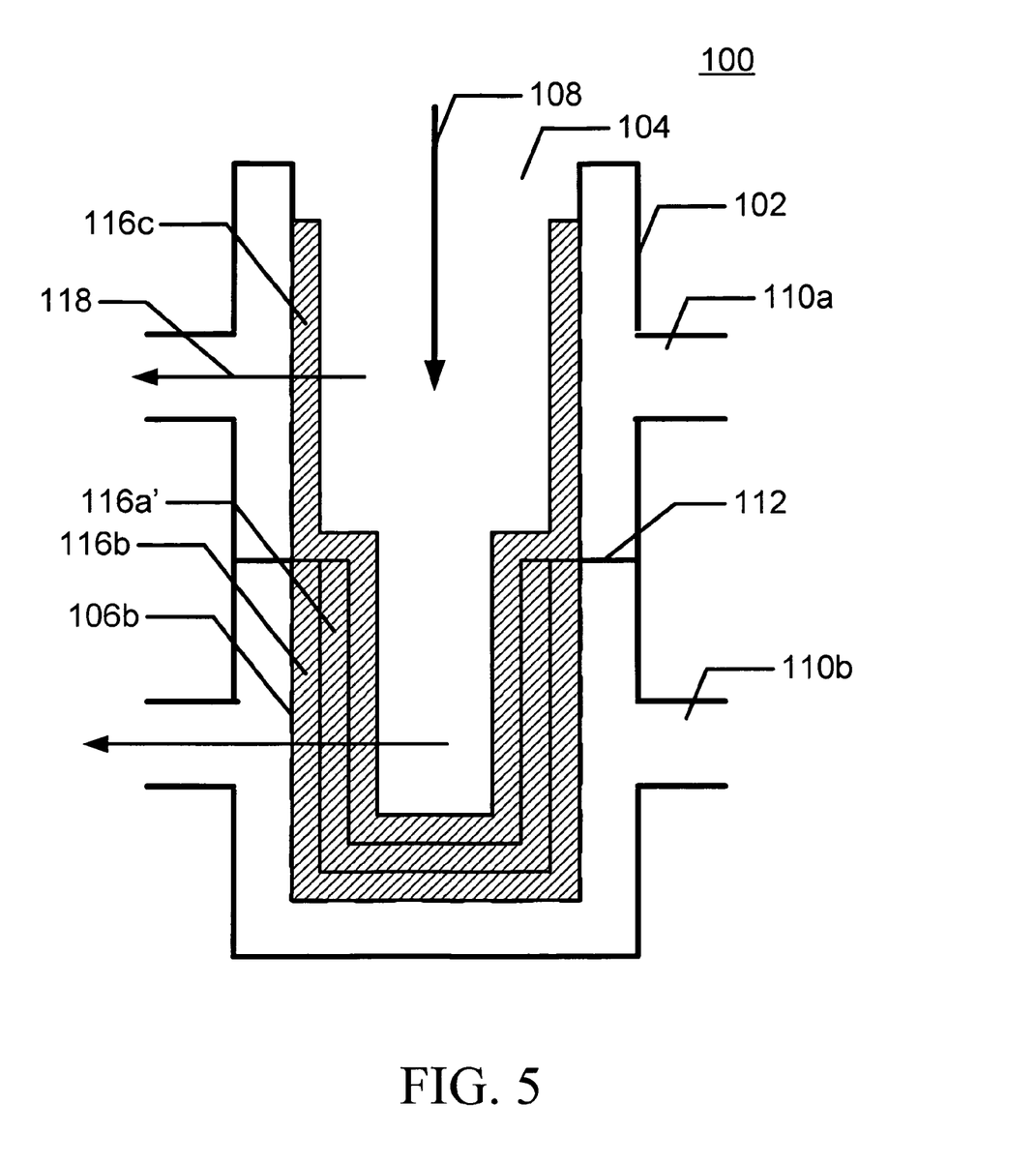

After regeneration, the regeneration region of the filter assembly will tend to be sufficiently unloaded to permit resumption of the filtration the higher flow rates desired during normal filtration operation. As illustrated in FIG. 5, resumption of the filtration process will result in the formation of an additional layer of filter cake 116c at which point the regeneration process may be repeated. As will be appreciated by those skilled in the art, the example embodiments of the apparatus disclosed may be adapted to provide for the incremental backwashing of a number of separated filter elements and/or filter regions of the filter assembly during normal operation.

For those filtration systems intended for use in conjunction with nuclear fuel cleaning applications, the filter assembly and filter housing may be configured in a manner that allows a portion of the filtration system to be handled and stored using equipment and techniques adapted for the handling of a similarly configured nuclear fuel assembly in use at the intended site. By utilizing a common configuration, the ultrasonic agitation utilized during the regeneration process may be provided by an ultrasonic fuel cleaning fixture including, for example, the cleaning fixtures disclosed in U.S. Pat. No. 6,396,892, the contents of which are hereby incorporated by reference in its entirety, previously adapted for fuel cleaning. Alternatively, another conventional or custom-designed ultrasonic agitator may be utilized for applying sufficient ultrasonic energy to the filter assembly to separate a portion of the accumulated particulates and/or filter cake from the regeneration region(s) of the filter assembly when no ultrasonic fuel cleaning system is readily available.

Alternate embodiments of the filtration system and filter assembly, include, but are not limited to, varying the relative areas of the regeneration region and the collection region, configuring the filter assembly to provide a plurality of regeneration regions and/or collection regions, providing a plurality of flow paths that allow for the selective configuration of one or more regions as either a regeneration region or a collection region, thereby allowing modifications of the relative areas of the regeneration region and collection region during service.

Alternate embodiments of the filtration system and filter assembly, also include, but are not limited to, configuring a plurality of filter elements in parallel, series or series/parallel configurations through the use of appropriate conduit arrangements and cooperating valve assemblies or equivalent devices. Example embodiments of such configurations include, but are not limited to, staged-filtration arrangements wherein successively smaller particles are captured by each stage of filtration, such as by using media with different effective "micron ratings," pore sizes and/or media depth in a plurality of filter stages.

Alternate embodiments of the filtration system and filter assembly, also include, but are not limited to, configurations that permit use of conventional filter packaging. When using conventional filter packaging, the example embodiments of the methods and apparatus can be achieved using at least one of the conventional filter packages as the regeneration region and at least one of the filter packages as the collection region during backflush operations.

Alternate embodiments of the filtration system and filter assembly, also include, but are not limited to, variations wherein the effective length of the collection region is extended by combining a porous section of the collection region in series with a non-porous section (i.e., solid tube) and constructing the collection region using media that is less suitable for backwashing (i. e., a filter assembly construction configured for application of a pressure differential in only a preferred direction).

Figure 9:
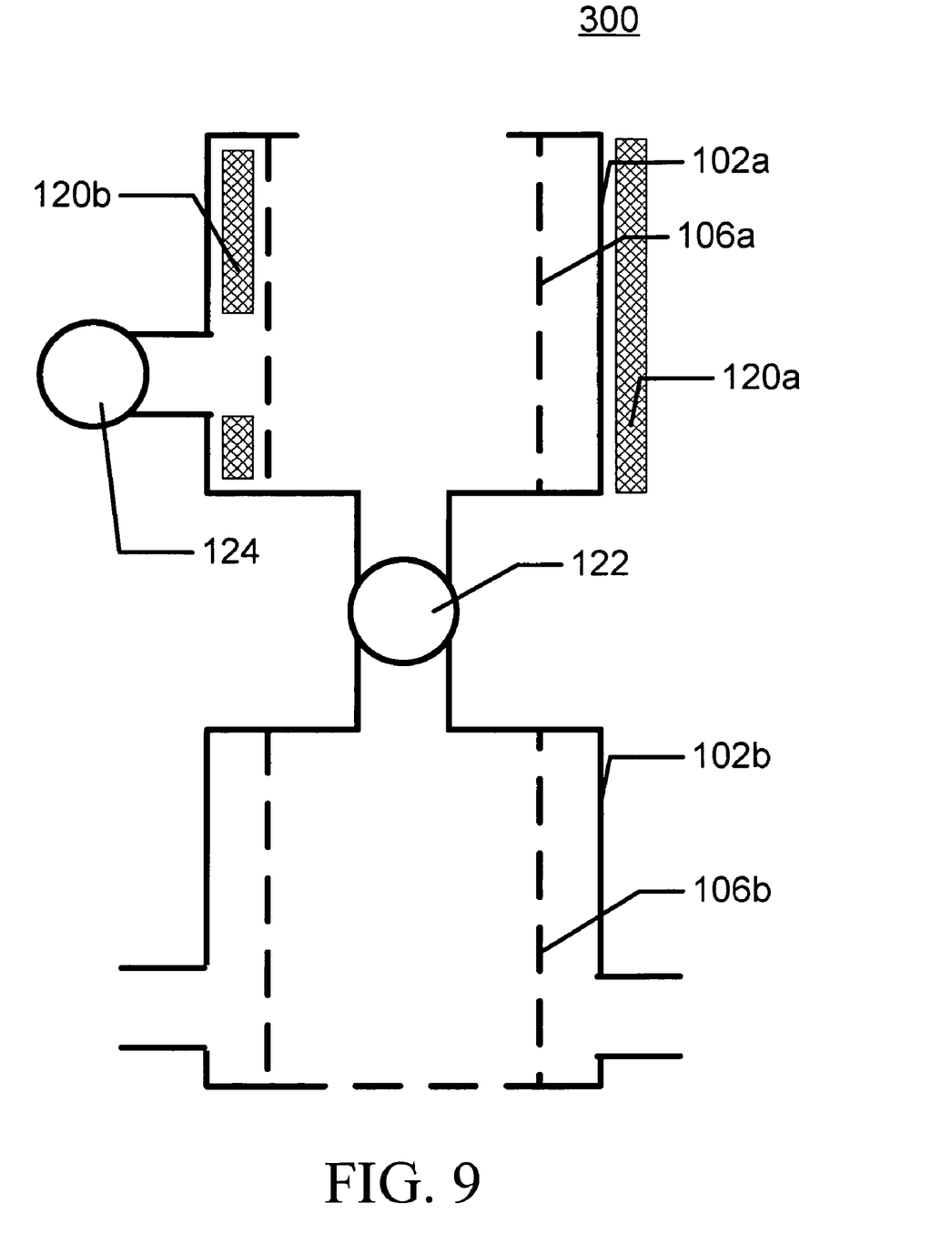
FIG. 9 illustrates another example embodiment of an apparatus suitable for practicing some embodiments of the disclosed filtration method.

Alternate embodiments of the filtration system and filter assembly, also include, but are not limited to, utilizing materials exhibiting enhanced resistance to high radiation fields, utilizing packaging is designed to include a permanent or remotely-operable port, opening or penetration that can be used to drain fluid from the filter by the action of gravity when the filter is maintained in an appropriate position, e.g., an upright position, utilizing packaging that includes a check valve or equivalent structure configured for suppressing or preventing the migration of captured particulates from a filter assembly in the absence of a fluid flow and utilizing packaging designed for the remote operation of valves or equivalent structure that allow the flow path(s) to and from the various regions or sections of the filter assembly to be aligned with various flow sources, conduits and sinks. As illustrated in FIG. 9, for example, the filtration system 300 may be configured with separate filter housing units 102*a*, 102*b* for separating the regeneration 106*a* and collection 106*b* regions of the filter assembly, may include external 120*a* or internal 120*b* ultrasonic assemblies and one or more valve assemblies 122, 124 for controlling the fluid flows through the filter assembly.

Alternate embodiments of the filtration system and filter assembly, also include, but are not limited to, utilizing packaging designed for integrating ultrasonic transducers with the remainder of the filter package and including means for monitoring various process parameters such as pressure and flow rate at one or more locations within the filter assembly, filter housing and/or conduits.

As will be appreciated by those skilled in the art, the features and elements of the alternative example embodiments detailed above may be combined to produce additional embodiments that would be suitable for practicing methods in accord with the example embodiments disclosed.

EXAMPLE 1

A laboratory scale test was performed to determine the extent to which the life/capacity of a filter could be extended with a method and apparatus according to the example embodiments disclosed herein. The test fixture consisted of two 10 inch (25 cm) filter cartridges arranged as shown in FIG. 1, with the upper cartridge configured as the regeneration region and the lower cartridge configured as the collection region. The filter cartridges were loaded with test dust as shown in FIG. 2 until the differential pressure across the filter assembly reached a prescribed end-of-life pressure limit of about 35 psi (0.24 MPa).

Figure 7:
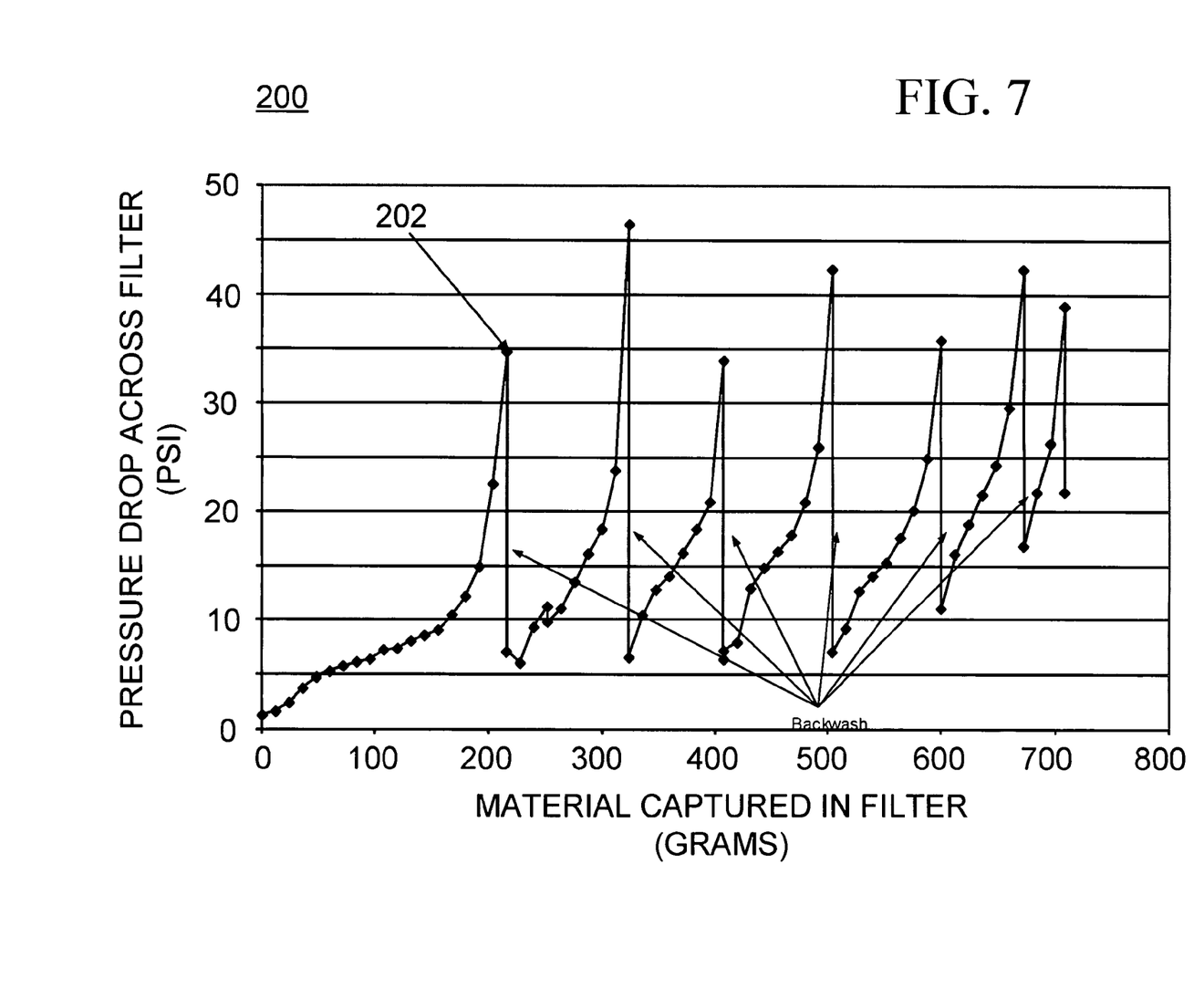
FIG. 7 illustrates pressure and particulate capture data generated practicing an embodiment of the methods described on an example embodiment of a suitable apparatus for practicing the method.
Figure 8:
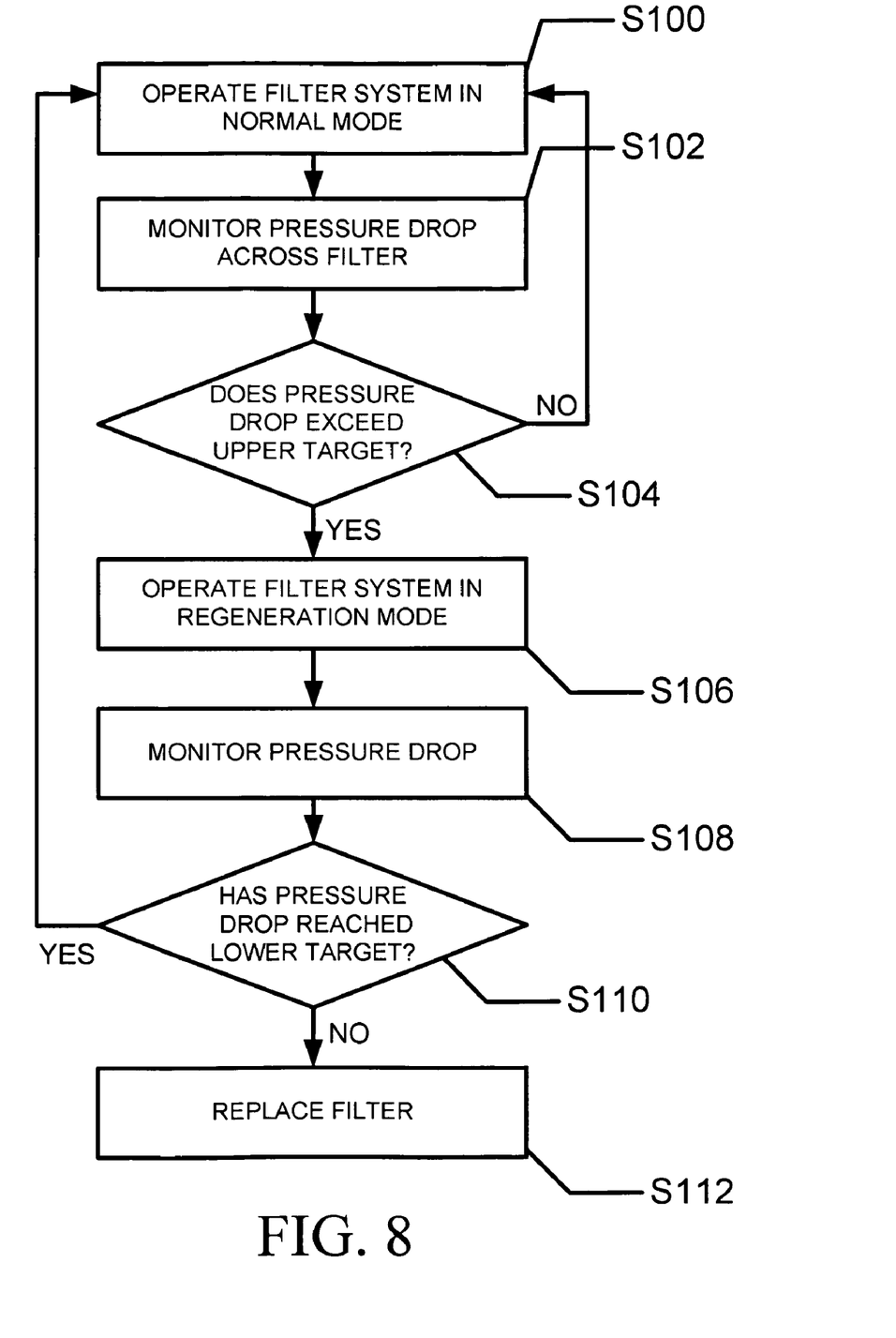
FIG. 8 illustrates an example embodiment of steps that could be utilized in practicing an example embodiment of the method as illustrated in FIGS. 2-5.

The test fixture was then ultrasonically agitated and a portion of the filter cake was backwashed from the regeneration region into the collection region (FIGS. 3 and 4). The filter system was then run in the normal loading configuration (FIG. 5) and the post-regeneration filter differential pressure was recorded. This sequence of operations was then repeated (see FIG. 8 and steps S100 to S112) until the filter assembly became sufficiently loaded that regeneration was not sufficient to reduce the differential pressure sufficiently to reach a baseline value of about 20 psi (0.14 MPa) at which point the test was terminated. The differential pressure data and particulate capture data are providing in graph 200 as illustrated in FIG. 7. The backwashing process was found to have increased the particulate holding capacity of the filter cartridges by a factor of approximately 3.3. Upon disassembly of the test fixture, the lower filter cartridge was found to be packed solid with test dust. The test data suggests that the total particulate holding capacity could be increased further by increasing the percentage of filter area in the bottom region.

As will be appreciated by those skilled in the art, the construction of the filter assemblies and, in particular, the filtration media, must be configured to allow for the reverse flow associated with the backwashing process and to provide sufficient mechanical strength to withstand the ultrasonic agitation without damaging the media.

The example embodiments of the filter assembly and methods of operating such filter assemblies may include one or more features including, but not limited to arranging the filter assembly so that a portion of the media is used both for primary filtration (when the filter assembly is new) and for capturing backwashed waste (during regeneration processing). Such a configuration would reduce or eliminate the need to use additional media, flow arrangements or structure to capture the backwashed waste without substantially degrading the performance of the filter assembly relative to a similar filter element not incorporating the internal backwash capture configuration.

The filter regeneration process relocates waste within the filter to increase the capacity of a disposable filter element. Existing systems use ultrasound to remove waste from the media so that it can be flushed out of the filter element, with the waste stream either discharged directly or filtered onto a secondary disposal media. In a method according to an example embodiment, all or substantially all of the backwashed waste is maintained within the filter element so that there is no need for additional handling of the hazardous waste and the problems associated therein.

The combination of ultrasonic agitation and low flow rate backwashing of clean region. Ultrasonic agitation facilitates low flow rate backflushing, which in turn permits internal capture of the backflushed waste on the highly loaded region of the filter. Without the ultrasonic agitation, it would be difficult, if not impossible, to generate a sufficiently high backflush flow rate through the regeneration region to dislodge particulate waste while simultaneously filtering that high flow of fluid through the more highly loaded collection region of the filter.

In the example embodiments, the filter assembly can be packaged and configured to resemble a nuclear fuel assembly for ease of handling and storage, and for compatibility with an existing ultrasonic fuel cleaning system. As will be appreciated by those skilled in the art, the filter assemblies according to the example embodiments may be readily adapted to any conventional packaging format including, for example, configurations used by Westinghouse/ABB in the late 1990s in constructing a system (FILDEC) that utilized filters housed in a fuel assembly shaped structure.

While the disclosed inventions have been particularly shown and described with reference to examples embodiments thereof, these inventions should not be construed as being limited to the particular embodiments set forth herein; rather, these example embodiments are provided to convey more fully the concept of the invention to those skilled in the art. Thus, it will be apparent to those of ordinary skill in the art that various changes in form and details may be made therein without departing from the spirit and scope of the inventions as defined by the following claims.

We claim:

1. A filtration method comprising:
    passing a first flow containing particulates though a regeneration region and a collection region of a filter assembly, the first flow passing through the filter assembly in a filtering flow direction;
    collecting a first quantity of particulates from the first flow on the regeneration region and a second quantity of particulates from the first flow on the collection region;
    terminating the first flow through the regeneration region and passing a second backwashing flow through the regeneration region in a backwashing flow direction;
    applying ultrasonic energy to the regeneration region, wherein the ultrasonic energy and/or second backwashing flow releases a portion of the first quantity of particulates into the second flow to form a third flow containing particulates;
    passing a portion of the third flow through the collection region of the filter assembly in a filtering flow direction of the collection region, thereby collecting a third quantity of particulates on the collection region; and
    terminating the third flow and resuming the first flow through the regeneration region and collection region in the filtering flow direction.

2. The filtration method according to claim 1, wherein:
    the first, second and third quantities of particulates are retained within the filter assembly.

3. The method of claim 1, wherein the second flow passes through the regeneration region in the backwashing flow direction while the third flow simultaneously passes through the collection region in the filtering flow direction.

4. The method of claim 1, wherein the third quantity of particulates comprises at least some of the portion of the first quantity of particulates.

5. The method of claim 1, wherein a flow passes through the regeneration region in the backwashing flow direction then continues on to pass through the collection region in the filtering flow direction, thereby causing particulates that were previously collected on the regeneration region to be released from the regeneration region and collected on the collection region.

6. A filtration method comprising:
    passing a first flow though a regeneration region of a filter assembly in a filtering flow direction, thereby filtering the first flow through the regeneration region and collecting particulates on the regeneration region;
    terminating the first flow;
    passing a second flow sequentially through the regeneration region in a backwashing flow direction and then through a collection region of the filter assembly in a filtering flow direction;
    applying ultrasonic energy to the regeneration region, wherein the ultrasonic energy and/or said second flow causes particulates that were previously collected on the regeneration region to be released from the regeneration region and then filtered from the second flow by the collection region and collected on the collection region;
    terminating the second flow; and
    resuming the first flow.

7. The method of claim 6, wherein:
    the method further comprises, while passing the first flow though the regeneration region, passing a third flow though the collection region in the filtering flow direction, thereby filtering the third flow through the collection region and collecting particulates on the collection region;
    said terminating of the first flow further comprises terminating the third flow; and
    said resuming of the first flow further comprises resuming the third flow.

* * * * *